(12) United States Patent
Scales

(10) Patent No.: US 6,240,500 B1
(45) Date of Patent: May 29, 2001

(54) METHOD FOR DYNAMICALLY PLACING PROCEDURES OF A PROGRAM IN A MEMORY

(75) Inventor: Daniel J. Scales, Mountain View, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/093,223

(22) Filed: Jun. 8, 1998

(51) Int. Cl.[7] .............................. G06F 12/00; G06F 9/00
(52) U.S. Cl. ...................... 711/202; 711/170; 709/100; 717/9
(58) Field of Search ..................... 711/202, 170, 711/133; 717/7, 9, 2; 709/100; 714/38

(56) References Cited

U.S. PATENT DOCUMENTS

| 4,991,088 |   | 2/1991  | Kam ................................. 364/200 |
| 5,212,794 |   | 5/1993  | Pettis et al. ..................... 395/700 |
| 5,303,377 |   | 4/1994  | Gupta et al. .................... 395/700 |
| 5,630,097 | * | 5/1997  | Orbits et al. .................... 395/492 |
| 5,664,191 |   | 9/1997  | Davidson et al. ................ 395/670 |
| 5,887,159 | * | 3/1999  | Burrows ........................... 395/567 |
| 5,940,621 | * | 8/1999  | Caldwell ........................... 395/709 |
| 5,974,536 | * | 10/1999 | Richardson ....................... 712/215 |

OTHER PUBLICATIONS

IBM TDB "Facilitating Profiling–BAsed Linkage Ordering". vol. 39, Issue No. 1, pp. 1115–116, Jan. 1996.*
IBM TDB "Automatic Program Reordering for Data Refernces in Unified Cache", vol. 39, Issue No. 4, pp. 117–118, Jan. 1996.*
Chen et al., Improving Instruction Locality with Just–In–Time Code Layout.

* cited by examiner

Primary Examiner—Do Hyun Yoo
Assistant Examiner—Kimberly McLean
(74) Attorney, Agent, or Firm—Pennie & Edmonds LLP

(57) ABSTRACT

A method places procedures of an application program in a memory in order to maximize performance. The application program is first mapped to non-executable addresses of the memory. A segment of the memory large enough to store the program is allocated as executable. The procedures are then copied from the mapped non-executable addresses to the executable segment as the procedures are executed. The procedures are copied in the order that they are executed.

25 Claims, 2 Drawing Sheets

METHOD FOR DYNAMICALLY PLACING PROCEDURES OF A PROGRAM IN A MEMORY

FIELD OF THE INVENTION

This invention relates generally to placing procedures of software programs in a memory during the execution of instructions of the programs, and more particularly to placing the procedures so as to minimize misses in a cache memory.

BACKGROUND OF THE INVENTION

In computer systems, it is desired to improve the performance of large production applications such as database servers. These applications often have a huge number of features and include large numbers of instructions in single executable images of the applications. For example, an executable image for the Oracle 7.3 database application includes about nine MegaBytes of instructions.

In addition, many of these large applications are known to have a large instruction "footprint"—that is, a large number of instructions are used repeatedly during the execution of the application. The large instruction footprint causes these applications to incur a large number of instruction cache capacity misses, particularly in the relatively small first-level instruction cache typically co-located on the same semiconductor chip with the processor. Even worse, a calling procedure may overlap with a called procedure in a cache. In that case, there is direct conflict.

Because of the cache misses, a large percentage of an application's execution time can be consumed by processor stalls while missing instructions are fetched from more distant levels of memory. For example, when the Oracle application is executing the TPC benchmarks on Digital Equipment Corporation's AlphaServer 4100 multi-processor, instruction stalls can account for up to 30% of the execution time.

In the prior art, instruction stalls due to cache misses have been reduced by controlling where the instructions are placed in memory. By careful placement of instruction, caches can take advantage of spatial localities. Most systems have made a static determination for the layout of instructions at compile time or link time.

For instance, linkers have been used to construct a call graph of the application. The call graph indicates how the procedures are called. Procedures that call each other can be placed together in the memory. If procedures are placed close to each other, cache conflicts are minimized, even in a direct-mapped instruction cache. Furthermore, if the size of the instruction cache is known, then procedures can be placed in a non-conflicting manner, even when they are not immediately adjacent to each other, which may not always be possible.

However, statically determining an optimal placement for procedures is difficult. In many cases, the actual execution flow may depend on the run-time environment, such as the workload (data) that is processed. Usually, the workload cannot be determined statically. In addition, cache conflicts need only be avoided for procedures that call each other often. A procedure that is called only occasionally does not require optimal placement.

Many systems have used profile information to guide the layout of instructions at link time. Profile information is statistical data that are collected during execution of the application. The statistics can identify the relative frequency at which procedures are called.

However, profile-based placement has two problems. First, users have to profile the application, and the application has to be re-compiled or re-linked to take advantage of the optimal placement. Second, even with profiling, there is no guarantee that the statistics will reflect different uses of the application.

The second problem is especially interesting in the case of an application such as the Oracle database server. The Oracle program can be used for on-line transaction processing (OLTP), as well for decision support systems (DSS). These different uses might possibly have totally different execution profiles, consequently, an instruction layout for one use may be totally unsuitable for the other. Optimally satisfying both needs would require different versions of the application.

In one prior art simulated approach, instructions are dynamically placed in the memory by a dynamic loader. This approach is described by Chen et al. in "Improving Instruction Locality with Just-In-Time Code Layout", The 1997 USENIX Windows NT Workshop, August 1997. There, a dynamic layout approach for reducing instruction cache conflicts is evaluated. However, the approach is only a simulation without any actual implementations in a real system.

The simulation avoids a number of several hard problems that must be solved for practical systems. A particular problem that will be encountered during practical dynamic instruction placement is the use of indirect procedure calls, for example, the use of function pointers in the C programming language. Because the initialization and utility routines for C programs typically make use of function pointers in a modem operating system, the prior art approach would not work in current systems, even if the actual application does not produce or use procedure pointers.

There is also a problem with intercepting calls to procedures that have not yet been placed in memory. According to Chen, the entry points of the procedures would be replaced by small "thunks" of instructions. These instructions would effectively "jump" to the dynamic loader when the procedures are called. Patching the "thunks" requires an extra pass over the entire program at program startup to install the thunks, or the stored copy of the executable image has to be changed.

There would be a considerable run-time overhead should this simulation ever be implemented in a real system, and the behavior of this method in a complex large-scale database application is difficult to predict.

Therefore, there is a need for an efficient and practical method that can dynamically place instructions of an application program in a memory of a computer system while the program is executing so as to reduce conflicts of the instructions in caches.

SUMMARY OF THE INVENTION

The invention provides a method for placing procedures of an application program in a memory. A stored copy of the application program is first mapped to non-executable addresses of the memory. A segment of the memory large enough to store the program is allocated as executable. The procedures are then copied from the mapped non-executable addresses to the allocated executable segment in the order that the procedures are called to dynamically place the procedures of the program in the memory.

In one aspect of the invention, a starting procedure of the program is copied to the segment by a loader, and all procedure calls in the starting procedure are modified to be procedure calls to the loader. The order in which the procedures are called determines the order in which the procedures are placed in the segment memory, so that procedures that call each other are placed adjacent to each other. After the called procedures have been placed in the segment, the destination addresses of procedure calls are modified to indicate the new locations of the procedures.

If a particular procedure attempts to call another procedure via a pointer that is a reference to an address in the original non-executable segment, then a signal is generated to call the loader to copy the required procedure. As procedures are copied and placed, procedure calls via jump instruction calls using absolute addresses are converted to calls using branch instruction calls using relative addresses where possible.

DETAILED DESCRIPTION OF PREFERRED EMBODIMENTS

Introduction

Figure 1:
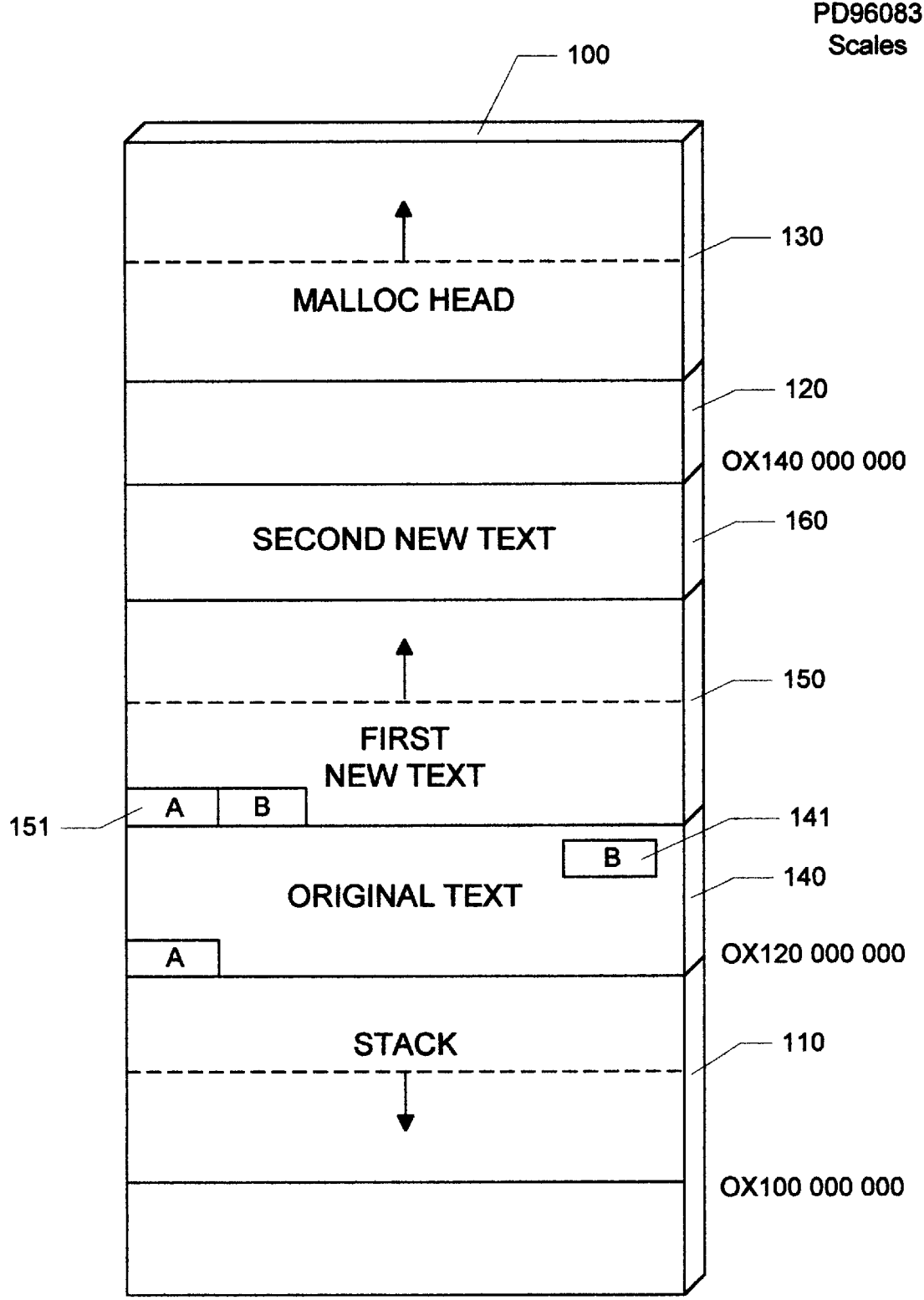
FIG. 1 is a block diagram of a memory allocated according to the invention.

A method for dynamically placing procedures of an application program in a memory of a computer system proceeds as follows. A stored copy of the application program is first mapped to a non-executable virtual address space. In addition, an empty executable "text" segment is allocated for the program by a dynamic loader. The allocated segment is large enough to store the program. The term text is generally used to refer to the instructions of the program.

The dynamic loader copies the procedures from the non-executable address space to the allocated executable text segment in the order that the procedures are called. As the procedures are copied, all procedure calls are replaced by calls to the dynamic loader. In addition, the loader performs any necessary changes ("relocations") in the instructions of the procedures because the procedures have been copied to new locations. As the program executes, the dynamic loader will be invoked when a procedure attempts to call another procedure that has not yet been placed in the text segment.

The loader places the called procedures in the text segment in the order that they are called. The destination addresses in the procedure call instructions of the calling procedure are replaced to now call the procedure at its new location in the text segment, and execution continues. That is, destination addresses of calls are adjusted taking into consideration the current program counter (PC) and other registers such as the global pointer (GP) register, and the new locations of the procedures.

Eventually, all called procedures will be placed. Note, any procedures that are never called during a particular execution, i.e., "dead code," will not be copied. In other words, the method only copies procedures that are actually used. Large applications may include many procedures that are not needed for a particular execution.

Indirect Procedure Calls

The main complexity concerns how to handle indirect procedure calls. The application program may generate data that are procedure pointers. That is, the data are a destination address of a procedure that is computed as the program executes. The data are used as an operand in, for example, a computed "jump to subroutine" (jsr) instruction on Digital's Alpha processors.

Because the destination address of procedure pointers may change for successive executions of the procedure call, it is not possible to locate and change all procedure pointers to particular destinations when the procedures are placed in memory. Therefore, a call could be to the wrong destination, the procedure's old location.

The solution is to initially map the entire application to an address space of the memory that is allocated as non-executable before the application is executed. In the UNIX operating system, this can be done using the "mmap( )" function. If the application is mapped in such a manner, then the dynamic loader is invoked by a signal when the application attempts to call a procedure that has a destination address in the non-executable address space, i.e., calls a procedure using an "old" destination address or pointer.

Layout of Address Space in Memory

FIG. 1 shows how the address space of a memory 100 of a computer system is allocated to allow dynamic procedure placement according to the invention. The memory 100 uses 64-bit virtual addresses as are found on Digital Equipment Corporation's Alpha processors. It should be understood that the invention is equally applicable to other addressing mechanisms. In FIG. 1, the arrows indicate the direction of expansion for the various allocated regions. Because of the virtual address space, large regions of memory can liberally be allocated to ensure no overflow or underflows during execution.

Some of the memory 100 is allocated for the stack 110, data 120, and the "malloc" heap 130. These allocations are conventional. A stored copy of the application program, as produced by a linker, is mapped to an original text segment 140 in its normal location. As stated above, the segment 140 is protected as non-executable. A new text segment 150 is also allocated and made executable. It is to this area that the dynamic loader will copy the procedures as they are called during execution.

Note, in FIG. 1, this region is labeled as the "first" new segment 140. The present method can be restarted to dynamically place procedures in another ("second") text segment 160 during different phases of the executing application, perhaps depending on workload. This variation and its advantages are described in detail below.

The starting procedure (A) 151 is placed at the beginning of the new text segment 150. In the Digital UNIX operating system, the starting procedure is the "_start( ) function. All procedure call instructions, for example, jsr and bsr instructions on the Alpha processor, are replaced with calls to the loader. Execution flow is transferred to the starting procedure A 151.

When procedure A calls the next procedure directly or indirectly, for example, procedure B 141, that has not yet been placed in the new text segment 150, the loader will be invoked to place the called procedure next to the calling procedure A in the new text segment 150. The procedure call instruction in the calling procedure is also updated. If procedure A originally called procedure B via a direct procedure call, e.g., a bsr instruction on a Digital Alpha processor, then the call is updated so that procedure A calls procedure B directly at its new executable address. If procedure A calls procedure B via an indirect procedure call, e.g., a jsr instruction, then the original indirect call is restored, because procedure A may call a number of different procedures via the indirect call. All known procedure pointers to procedure B in the application program are updated to point to the new address of procedure B.

A signal (or trap) will be generated when procedure A 151 attempt to call a procedure in the "old" original non-executable text segment 140 via an indirect call using an "old" address. Whenever the loader is invoked by the signal, this is an indication that an indirect procedure call has been made via a procedure pointer that has not yet been updated, i.e., the pointer stores the "old" address of the procedure. In that case, the following steps are performed.

Based on the operands of the calling instruction and the contents of the processor registers, the loader determines the destination address of the indirect procedure call. If the called procedure has not already been placed in the new text segment 150, then the loader copies the called procedure to the current end of the previously placed procedure, and replaces all procedure calls as described above. Otherwise, if the called procedure has been placed in the new text segment 150, then the loader uses the entry point address (destination address) of the called procedure.

The dynamic layout according to the invention yields better performance because of fewer cache misses. In addition, the present method yields better performance in the instruction look-aside buffer (TLB) because the active instructions are spread over fewer virtual memory pages. It should be understood that confining the spatial locality of frequently executed procedures will have better performance in any cached memory, on-chip, off-chip, or even paged dynamic random access memory, i.e., main memory.

JSR-to-BSR Conversion

The basic method for procedure placement according to the invention can further be enhanced to take advantage of the dynamic layout. Relatively large applications must often use a "jsr" type of instructions (a jump to a specific address) to implement a procedure call that cannot be reach by a "bsr" type of instruction (a branch to a relative address) because the called procedure is beyond the range that can be specified as a relative address.

Because the present method copies calling procedures next to each other and only copies executed procedures, less memory is used, and many of the jsr instructions can be replaced by bsr instructions (jsr-to-bsr conversion). When the jsr-to-bsr conversion occurs, extra instructions that update global pointer (GP) register values can be eliminated or bypassed. In addition, the jsr-to-bsr conversion can eliminate any instructions that are used to load the address of the called procedure into a register.

Instruction Hints

Some processors, such as Digital's Alpha processors, allow the programmer or compiler to set a "hint" for indirect jump instructions. The dynamic loader can set the hint on an unconverted jsr instruction to be the address of the likely called procedure, e.g., the procedure that is first called by the jsr, because the loader is invoked on the first call. This step can contribute to better performance even for jsr instructions that cannot be converted, because this is something that cannot be done by a compiler. Often applications are designed so that for a computed call (a source program "case" statement), the default case (procedure) is executed over and over, and other procedures are only called as rare exceptions.

Application Phase Dependent Procedure Placement

Another variation of the present method allows the placement of procedures to be restarted. Here, procedure placement as described above is initially performed in the first new text segment 150. Once all procedures have been placed, the application is allowed to execute for a predetermined time, or until a particular stage (procedure) is reached. For example, the application may be allowed to execute until the end of the "initialization" phase of the application. At this point, when the application is ready to process the "main" workload, the dynamic procedure placement is restarted. An additional "second" new text segment 160 is allocated and the first segment 150 is now mapped non-executable. Dynamic procedure placement is restarted with the second "new" text segment 160. During this phase, the segment 150 is treated in the same manner as the original text segment. Note that indirect procedure calls to addresses in the original text segment 140 or the new text segment 150 are correctly handled during the restart because both of the segments are protected as non-executable.

Here the advantage is that the later layout will likely be better, because now the application is executing the "core" or main set of procedures that will determine the application's performance. The core procedures are probably different than the ones used during initialization of the application.

However, when restarting a dynamic layout, return addresses found in the stack reference the first (now "old") new text 150. This problem of the stack storing the "old" return address is solved by now making the first text segment 150 non-executable as was done for the original text segment 140. When a procedure does a return using the address in the stack for the segment 150, a signal will be generated because the instructions at the old address cannot be executed. Again, the loader will be invoked. The loader copies the procedure to the second new text segment 160 when necessary and execution of the application is continued in the second new text segment 160.

Profiling During Procedure Placement

In this variation, the application is profiled while executing. In this mode, the calls to the dynamic loader are not replaced as procedures are copied. Consequently, the loader is invoked for each procedure call, and a call graph is constructed. The call graph contains information indicating how often procedures call each other, i.e., the call graph indicates call "frequency."

At the end of the profiling period, "important" (frequently called) procedures are identified, and these procedures are copied to the new text segment at optimal locations using the call graph information. Here, optimal means minimizing cache conflicts. The remaining "less important" procedures are dynamically placed during execution as described above. This hybrid static/dynamic placement can improve over a purely dynamic placement because the important procedures can be placed to eliminate any possibility of cache conflicts. In the case where conflicts still exist, a copy (clone) of a conflicting procedure can be placed elsewhere.

The restarts and profiling can be invoked by adaptive time-related conditions. For example, restarts and/or profiling can periodically be invoked for a long running application, perhaps, once per hour. If the layout after restart is similar to the previous layout, then the restart interval can be increased. If the procedure "mix" in the new layout is different, restarts can be invoked on a more frequent basis.

Method Steps

Figure 2:
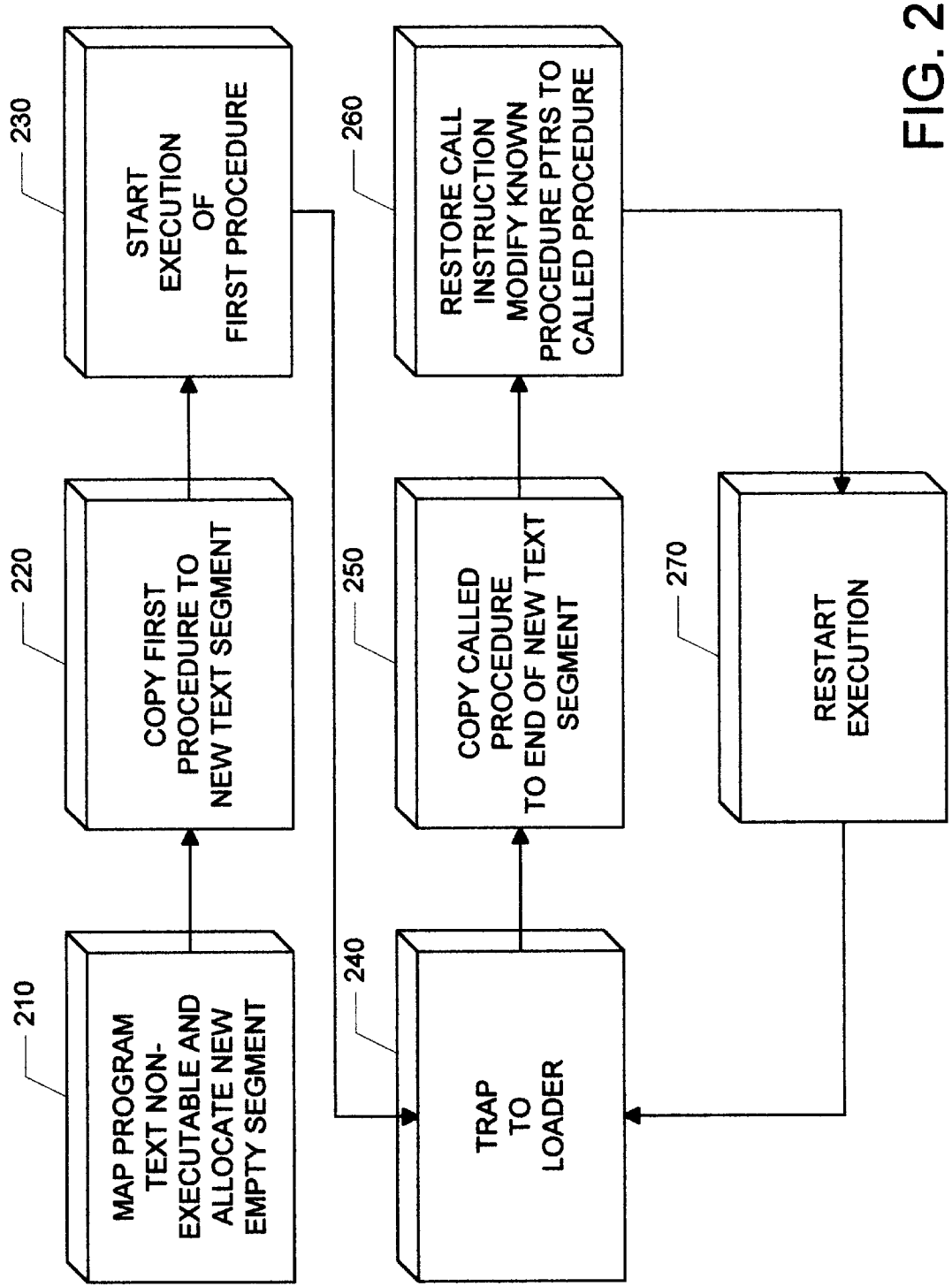
FIG. 2 is a flow diagram of the procedure placement according to the invention.

FIG. 2 shows the method steps 200 according to the invention. In step 210, the stored copy of the application program is mapped to non-executable memory, and an empty executable segment large enough to store the program is allocated. In step 220, the first executable procedure, i.e., the "start" procedure, is copied to the new segment. Step 230 transfers execution to the start procedure. Step 240 traps any calls to the non-executable segment back into the loader. In step 250, the loader copies the called procedure from the non-executable segment to the executable segment. Step 260 restores the trapped call instructions, and modifies known procedure pointers. Execution resumes in step 270.

Advantages

The present invention transparently improves the performance of an application program by dynamically placing procedures in a memory so that cache misses are reduced. The method is transparent in that the stored image of the application is never modified, and also the relocation of the procedures requires no user intervention, other than invoking the application by the dynamic loader. In addition, only executed procedures are placed so that memory requirements are reduced. Dynamic placement can also reduce the number of executed instructions due to instruction conversions. Other optimizations result in fewer instruction TLB faults, and reduced overhead due to calling conventions between procedures.

Measured results indicate that the present invention provides an immediate 10% improvement in the performance of the Oracle 7.3 database running a number of TPC-D benchmarks on a Digital Alpha 4100 server. Other applications experienced similar improvements. The invention may also improve the aggregate performance of a processor by reducing the size of the instruction working set of an application.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

I claim:

1. A computerized method for placing procedures of a program in a memory, comprising the steps of:
    mapping the program to non-executable addresses of the memory;
    allocating a segment of the memory as executable;
    copying one or more of the procedures from the non-executable addresses to the segment as the procedures are executed to dynamically place the procedures of the program in memory;
    while executing the procedures of the program, generating a trap when the executing procedure calls a procedure mapped to a non-executable address of the non-executable addresses; and
    responding to the trap by copying the called procedure to the segment when the called procedure has not previously been copied to the segment and invoking the called procedure at its location in the segment.

2. The method of claim 1 including copying a starting procedure of the program to the segment by a loader and modifying destination addresses of procedure calls in the starting procedure to be procedure calls to the loader.

3. The method of claim 1 wherein an order in which the procedures are called determines an order in which the procedures are copied to the segment to store a called procedure adjacent to a calling procedure.

4. The method of claim 2 including converting a procedure call via a jump instruction to a procedure call via a branch instruction.

5. The method of claim 2 including providing a hint for the destination address.

6. The method of claim 1 including repeating the mapping, allocating and copying steps for a different segment of the memory after the procedures of the program have been placed.

7. The method of claim 6 including generating a signal to call the loader if the application attempts to return to a procedure at a non-executable address.

8. The method of claim 7 including a profiling executing program to construct a call graph with profile information, and repeating the mapping, allocating and copying steps according to profile information in the call graph.

9. The method of claim 8 including statically placing a first set of procedures that are called most frequently, and dynamically placing a second set of procedures that are called least frequently.

10. The method of claim 6 including repeating according to adaptive time-related conditions.

11. The method of claim 1, wherein the responding step includes updating a stored procedure pointer in the executing program to a value corresponding to an address of the called procedure in the segment.

12. The method of claim 1, wherein the responding step includes, when the procedure call in the executing procedure that caused the trap to be generated is an indirect procedure call, updating a stored procedure pointer in the executing program to a value corresponding to an address of the called procedure in the segment.

13. The method of claim 1, wherein the copying step includes, modifying destination addresses of direct procedure calls in the copied procedures from the destination addresses of originally called procedures to a destination address of a loader procedure to form modified destination procedure calls; wherein the destination addresses of the originally called procedures are a subset of the non-executable addresses;

the method including:
    executing the loader procedure when any one of the modified direct procedure calls is executed, the loader procedure executing step including identifying the originally called procedure associated with the modified destination procedure call being executed;
    copying the identified originally called procedure to the segment if the identified originally called procedure has not previously been copied to the segment; and
    replacing the modified direct procedure call to the loader procedure with a new direct procedure call to the originally called procedure at its location in the segment.

14. The method of claim 13, wherein the copying step performed when executing the loader procedure includes modifying destination addresses of direct procedure calls in the originally called procedure from the destination addresses of respective originally called procedures to the destination address of the loader procedure to form modified destination procedure calls.

15. A computer program product for use in conjunction with a computer system, the computer program product comprising a computer readable storage medium and a computer program mechanism embedded therein, the computer program mechanism comprising:
    a runtime module for executing a program having a plurality of procedures, the runtime module including instructions for:
        mapping the program to non-executable addresses of the memory;
        allocating a segment of the memory as executable; and
        copying one or more of the procedures from the non-executable addresses to the segment as the procedures are executed to dynamically place the procedures of the program in memory;
    the runtime module further including a trap procedure, which is to be automatically invoked when the executing procedure calls a procedure mapped to a non-executable address of the non-executable addresses, the trap procedure including instructions for copying the called procedure to the segment when the called procedure has not previously been copied to the segment and invoking the called procedure at its location in the segment.

16. The computer program product of claim 15 wherein the instructions for copying include instructions for copying a starting procedure of the program to the segment by a loader and modifying destination addresses of procedure calls in the starting procedure to be procedure calls to the loader.

17. The computer program product of claim 15 wherein the instructions for copying include instructions for converting a procedure call via a jump instruction to a procedure call via a branch instruction.

18. The computer program product of claim 15 wherein the segment of the memory is a first segment and the runtime module includes instructions for repeating the mapping, allocating and copying to a second segment of the memory after at least a subset of the procedures of the program have been placed.

19. The computer program product of claim 18 wherein the trap procedure is configured to be invoked whenever a procedure call is made to a procedure in the first segment.

20. The computer program product of claim 18 including a profiling executing program to construct a call graph with profile information, and the runtime module includes instructions for repeating the mapping, allocating and copying according to profile information in the call graph.

21. The computer program product of claim 20, the runtime module including instructions for statically placing a first set of procedures that are called most frequently, and dynamically placing a second set of procedures that are called least frequently.

22. The computer program product of claim 15 wherein the trap procedure includes instructions for updating a stored procedure pointer in the executing program to a value corresponding to an address of the called procedure in the segment.

23. The computer program product of claim 15 wherein the trap procedure includes instructions, to be activated when the procedure call in the executing procedure that caused the trap to be generated is an indirect procedure call, for updating a stored procedure pointer in the executing program to a value corresponding to an address of the called procedure in the segment.

24. The computer program product of claim 15 wherein the instructions for copying include instructions for modifying destination addresses of direct procedure calls in the copied procedures from the destination addresses of originally called procedures to a destination address of a loader procedure to form modified destination procedure calls; wherein the destination addresses of the originally called procedures are a subset of the non-executable addresses;

the runtime module includes instructions for:

executing the loader procedure when any one of the modified direct procedure calls is executed, the loader procedure executing step including identifying the originally called procedure associated with the modified destination procedure call being executed;

copying the identified originally called procedure to the segment if the identified originally called procedure has not previously been copied to the segment; and replacing the modified direct procedure call to the loader procedure with a new direct procedure call to the originally called procedure at its location in the segment.

25. The computer program product of claim 24 wherein the instructions for copying, performed when executing the loader procedure, include instructions for modifying destination addresses of direct procedure calls in the originally called procedure from the destination addresses of respective originally called procedures to the destination address of the loader procedure to form modified destination procedure calls.

* * * * *